US005586888A

United States Patent [19]
Webb

[11] Patent Number: 5,586,888
[45] Date of Patent: Dec. 24, 1996

[54] METHOD OF ADAPTING A PAIR OF CHILDREN'S SHOES

[76] Inventor: Marlene K. Webb, 335 Lee Ave. So. Box 495, Cokato, Minn. 55321

[21] Appl. No.: 500,458

[22] Filed: Jul. 10, 1995

[51] Int. Cl.[6] .................................................. G09B 19/00
[52] U.S. Cl. ................................ 434/258; 36/112; 36/136
[58] Field of Search .................................. 434/258, 260, 434/247, 433; 2/245, 919, 246, 115; 40/636, 586; 36/112, 1, 100, 101, 136, 72 R

[56] References Cited

U.S. PATENT DOCUMENTS

| | | | |
|---|---|---|---|
| 2,068,946 | 1/1937 | Ferguson | 36/101 X |
| 3,258,858 | 7/1966 | Cariffe, Jr. | 434/260 X |
| 4,697,362 | 10/1987 | Wasserman | 36/136 |
| 4,712,319 | 12/1987 | Goria | 36/136 X |
| 5,136,726 | 8/1992 | Kellin et al. | 36/136 X |
| 5,240,418 | 8/1993 | Silverman et al. | 434/260 |
| 5,269,690 | 12/1993 | Zigon | 434/260 X |

*Primary Examiner*—Gene Mancene
*Assistant Examiner*—Jeffrey A. Smith
*Attorney, Agent, or Firm*—Leo Gregory

[57] ABSTRACT

This invention is a familiar design overlying the adjacent toe portion of a pair of childrens shoes. With the shoes properly positioned side by side, a child will see the design as a whole and relate the left foot shoe with its left foot and the right foot with its right foot shoe as the proper positions for the shoes to be worn.

1 Claim, 2 Drawing Sheets

METHOD OF ADAPTING A PAIR OF CHILDREN'S SHOES

BACKGROUND OF THE INVENTION

1. Field of the Invention

This invention relates to children's shoes and more particularly the matching of pairs of children's shoes.

2. Description of Prior Art

Reference is had to shoes for children from the time they can put them on until they can tell the right shoe from the left shoe which may range up in the ages of 2–7 years.

The general experience of mothers having children in this indicated range of age is that the children, not being able to distinguish the difference between the shoes of a pair of shoes, generally put the right shoe on the left foot and the left shoe on the right foot.

The applicant's method herein is directed toward providing an identification on the toe portions of a pair of shoes to clearly indicate to a child which is the right and which is the left shoe.

SUMMARY OF THE INVENTION

It is a principal object herein to provide for the correct matching of a pair of children's shoes for those children who are not able to distinguish a left shoe from a right shoe and vice versa.

It is a further object herein to adapt a pair of children's shoes to identify for the child which shoe is for the right foot and which is for the left foot.

It is another object herein to indicate by a marking on the toe portion of a shoe which is the right foot shoe and which is the left foot shoe.

It is also an object herein to provide an identification for a pair of children's shoes whereby said shoes will bear indicia which will clearly indicate to the child which is the proper shoe for each foot.

These and other objects and advantages of the invention herein will be set forth in the following description.

DESCRIPTION OF A PREFERRED EMBODIMENT

Figure 1:
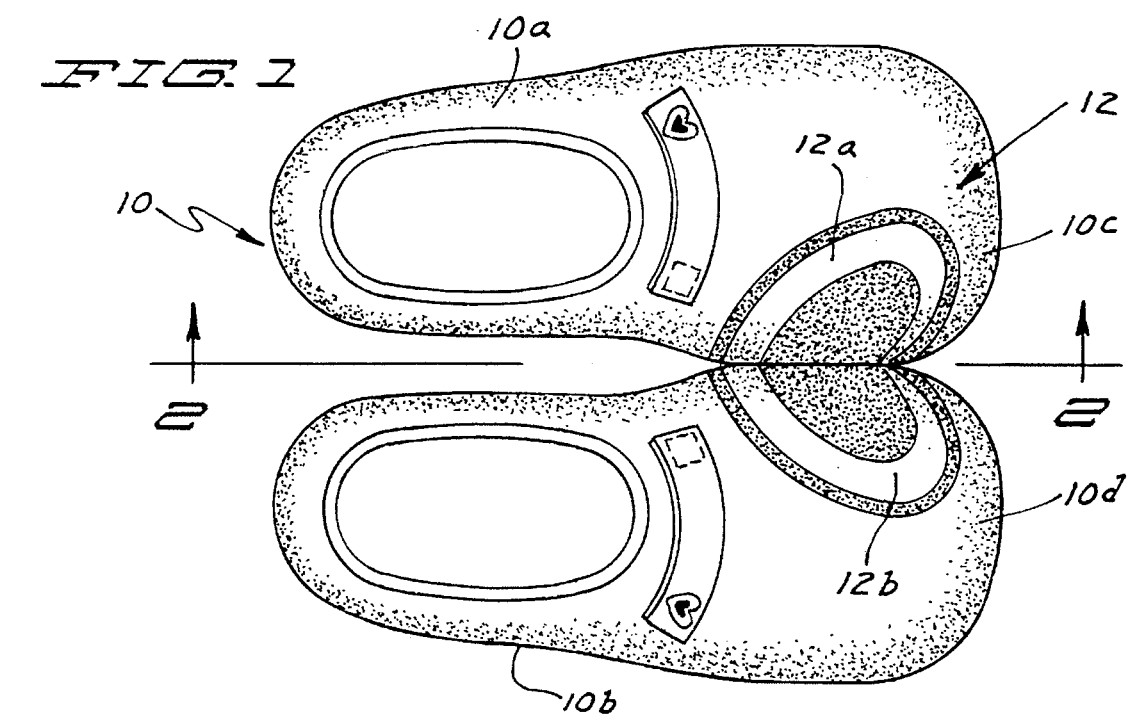
FIG. 1. Is a top plan view of a pair of a childs shoes.

Referring to the drawings and more particularly to FIG. 1, shown is a pair of a young child's shoes 10 such as for ages of two to seven years, this being an age spread during which a child may not know which is the left or right foot shoe, the left shoe being indicated as 10a and the right foot shoe as 10b. More often than not, the child puts the left shoe onto the right foot and the right shoe onto the left foot.

The invention herein relates to identifying the shoes as to the left or right foot in a manner which is meaningful to a child. The shoes 10 are representative of all the kinds of shoes a child may wear.

Figure 2:
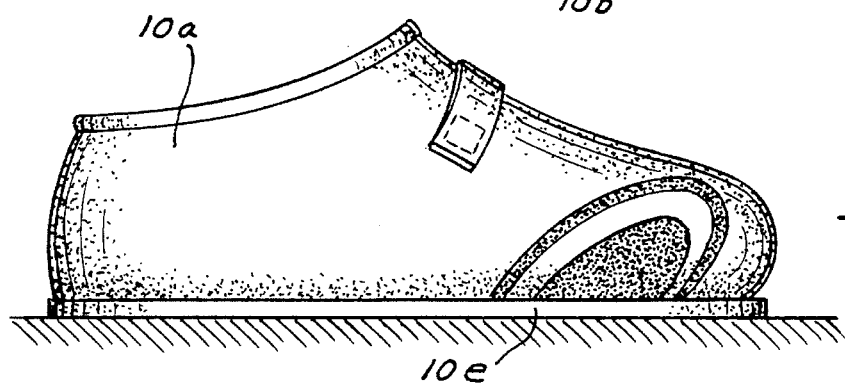
FIG. 2. Is a view in side elevation taken on line 2—2 of FIG. 1 as indicated.
Figure 3:
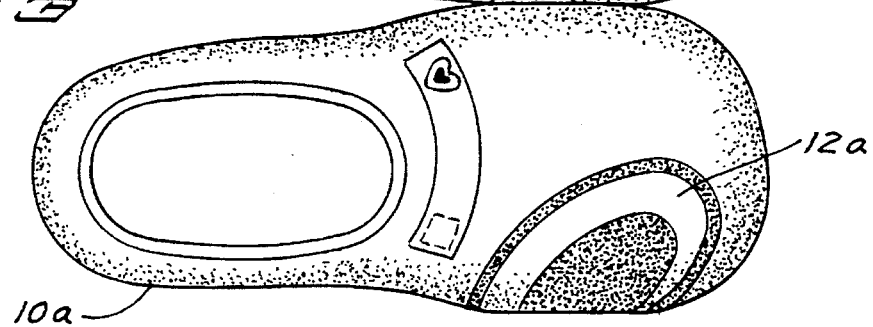
FIG. 3. Is a top plan view of an incorrectly positioned pair of a child's shoes.
Figure 4:
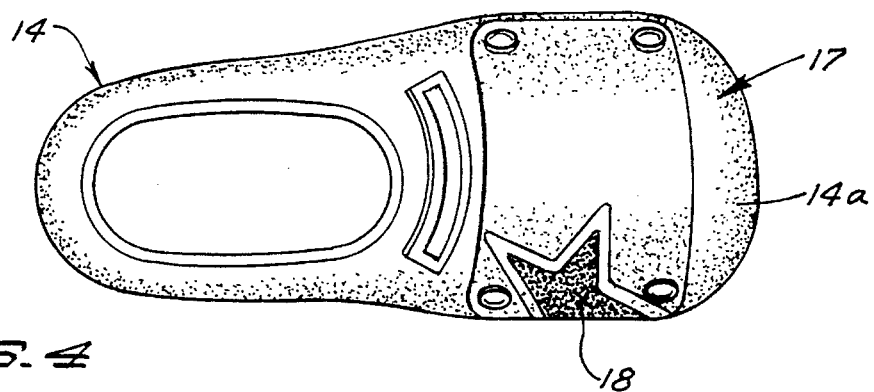
FIG. 4. Is a top plan view of a left foot shoe showing a different design and a modification of its application to the shoe.
Figure 5:
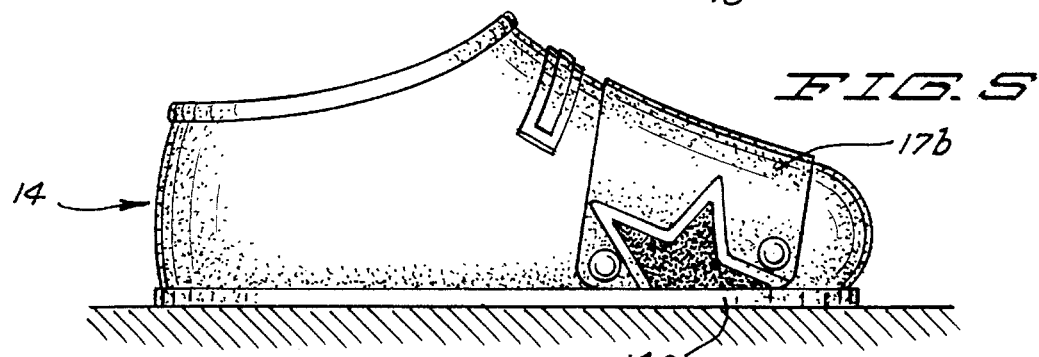
FIG. 5. Is a side view of the showing of FIG. 4.

Referring again to FIG. 1 in which the shoes 10a and 10b are correctly positioned, it is seen that overlying the upper and facing toe portions 10c and 10d of said shoes and extending down to the facing sole edges as at 10e in FIG. 2, is an enlarged heart shaped FIG. 12 having a half portion 12a thereof on the shoe 10a and a half portion 12b thereof on the shoe 10b. Thus, when the shoes are positioned as in FIG. 1, the heart is seen as a complete figure and will be recognized by a child, but when the shoes are positioned as in FIG. 3, the figure is meaningless and a child will know the shoes are not correctly positioned to be put on. FIG. 1 shows the shoes positioned to be put on the correspondingly positioned feet. It is presumed that a child will have been previously taught the purpose of the heart figure and that when seen as a whole it tells the child which shoe goes on which foot.

The figure of a heart is merely illustrative of a figure to be used. What is important is that the figure depicted be one known to and readily recognized by a child. The heart figure 12 of FIG. 1 is indicated as being imprinted on the shoes. The figure may be otherwise applied to a pair of shoes such as being removably attached thereto as herein after described.

Referring to FIGS. 4–7, only the left shoe 14 of a child's pair of shoes is shown and only for the purpose of illustrating other designs or figures and other means of applying the same to the shoes.

Figure 6:
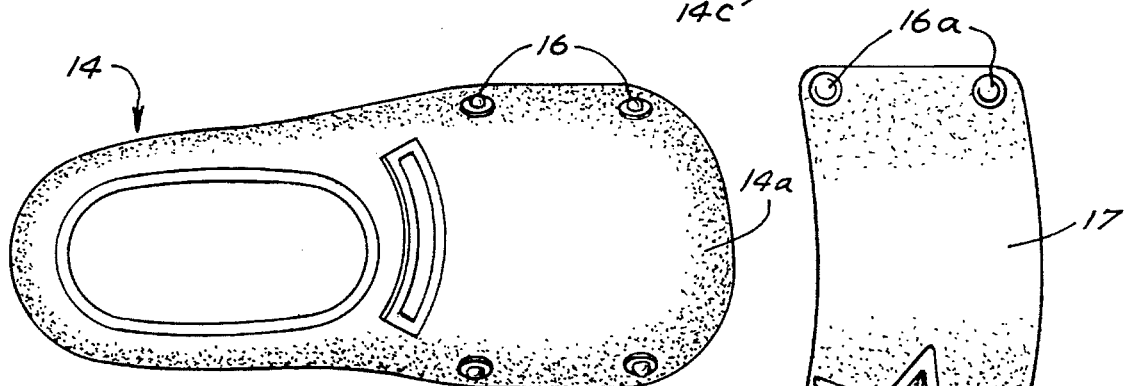
FIG. 6. Is a top plan view of a left foot shoe showing a modified fastening means for a strip carrying the design.
Figure 7:
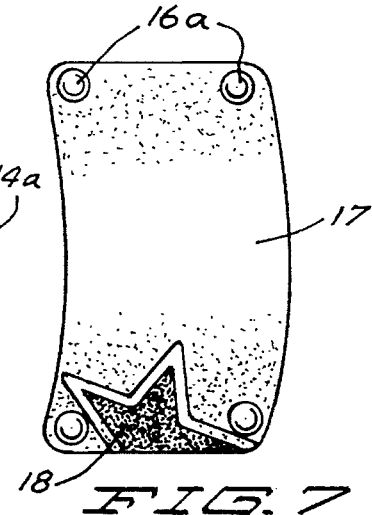
FIG. 7. Is a top plan view of a strip having a design imprinted thereon.

Referring particularly to FIG. 6, the toe portion 14a of the shoe 14 is shown has snaps 16 fastened thereon and in FIG. 7 is shown a strip 17 of appropriate material having mating snaps 16a whereby the strip is fastened overlying the toe portion of said shoe.

Said strip bears as a figure, the design of a star 18 of which one-half is shown and will extend from approximately the mid portion 17b thereof down the right side of the shoe to the sole 14c. The right shoe, not shown, will have a corresponding strip with the other half of the star thereon whereby when the shoes are properly positioned to correspond to the position of a child's feet, the star will be seen as an entirety. The child will have been taught to put its shoes on when it sees the whole figure and the shoes will then match the positions of its feet.

Figure 8:
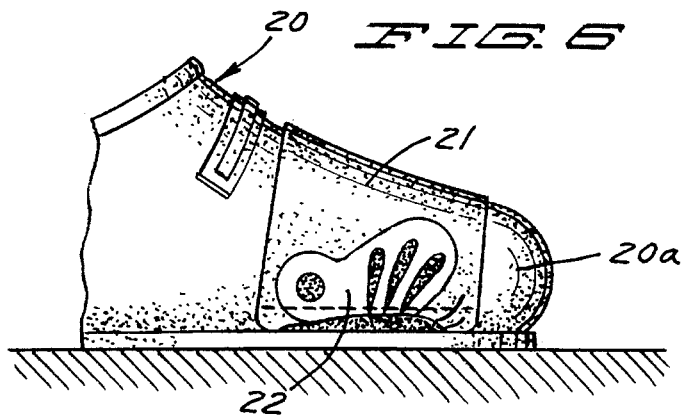
FIG. 8. Is a view in side elevation showing another variation in a design and a modification of its application to the shoe.

Referring to FIG. 8, a left shoe 20 is shown having a strip 21 overlying its toe portion 20a and being secured to said toe portion as by stitching.

Said strip 21 as with the strip 17 has a FIG. 22 thereon of a butterfly of which one-half is thereon and the other half will appear on the right shoe as above described in connection with the shoe 14.

It will be understood that various changes may be made in the form, details of arrangement and proportions of the invention without departing from its scope, which, generally stated, consists of a product capable of carrying out the objects above set forth, in the proportions and combinations of the proportions of the parts disclosed and defined in the appended claims.

What is claimed is:

1. A method for adapting a child's pair of shoes to indicate to the child which shoe is for the left foot and which is for the right foot consisting of the steps of positioning a pair of a child's shoes to have side-by-side engagement corresponding to the feet upon which they are worn, overlying adjacent engaging toe and side wall portions portions of said shoes with a design of a figure readily recognizable as a whole design by a child which tells the child the shoes are properly positioned to be put on the corresponding feet, and when said shoes are otherwise positioned, said figure is separated and meaningless telling the child that the shoes have to be otherwise positioned relative to each other to form of a whole design.

* * * * *